(12) United States Patent
Sohn et al.

(10) Patent No.: US 11,312,199 B2
(45) Date of Patent: Apr. 26, 2022

(54) ACTIVE VEHICLE HEIGHT CONTROL METHOD

(71) Applicants: Hyundai Motor Company, Seoul (KR); Kia Motors Corporation, Seoul (KR); Kookmin University Industry Academy Cooperation Foundation, Seoul (KR)

(72) Inventors: Young Il Sohn, Suwon-si (KR); Min Woo Soh, Seoul (KR); Ki Hong Park, Seoul (KR)

(73) Assignees: Hyundai Motor Company, Seoul (KR); Kia Motors Corporation, Seoul (KR); Kookmin University Industry Academy Cooperation Foundation, Seoul (KR)

( * ) Notice: Subject to any disclaimer, the term of this patent is extended or adjusted under 35 U.S.C. 154(b) by 407 days.

(21) Appl. No.: 16/689,423

(22) Filed: Nov. 20, 2019

(65) Prior Publication Data
US 2020/0398630 A1 Dec. 24, 2020

(30) Foreign Application Priority Data
Jun. 19, 2019 (KR) .................. 10-2019-0072759

(51) Int. Cl.
*B60G 17/0165* (2006.01)
*B60W 40/06* (2012.01)
*B60G 17/018* (2006.01)
*B60W 10/22* (2006.01)

(52) U.S. Cl.
CPC ..... *B60G 17/0165* (2013.01); *B60G 17/0182* (2013.01); *B60W 10/22* (2013.01); *B60W 40/06* (2013.01); *B60G 2400/823* (2013.01)

(58) Field of Classification Search
CPC .............. B60G 17/016; B60G 17/0161; B60G 17/0165; B60G 17/018; B60G 17/0182
See application file for complete search history.

(56) References Cited

U.S. PATENT DOCUMENTS

| 5,432,700 | A | 7/1995 | Hrovat et al. |
| 8,676,508 | B2 | 3/2014 | Schwarz |
| 9,533,539 | B2 * | 1/2017 | Eng ...................... B60G 17/019 |
| 9,902,229 | B2 * | 2/2018 | Mettrick .............. G05D 1/0891 |

(Continued)

FOREIGN PATENT DOCUMENTS

| JP | H 07-215032 A | 8/1995 |
| JP | H 08-40036 A | 2/1996 |

(Continued)

*Primary Examiner* — Aaron L Troost
(74) *Attorney, Agent, or Firm* — Morgan, Lewis & Bockius LLP

(57) ABSTRACT

An active vehicle height control method may include securing a road surface profile for unevenness of a road ahead of a vehicle and forming a target vehicle height profile by filtering the road surface profile. In addition, a controller is configured to form a disturbance profile using the road surface profile and the target vehicle height profile. The controller estimates vehicle behavior for the disturbance profile. Furthermore, the controller determines an inverse-phase control force that minimizes the estimated vehicle behavior, and drives an actuator using the inverse-phase control force to adjust a height of the vehicle.

7 Claims, 10 Drawing Sheets

(56) References Cited

U.S. PATENT DOCUMENTS

| | | | | |
|---|---|---|---|---|
| 2014/0195112 A1* | 7/2014 | Lu | ........................ | B60G 17/016 |
| | | | | 703/2 |
| 2016/0263959 A1* | 9/2016 | Göhrle | ................. | B60G 17/018 |
| 2017/0096042 A1* | 4/2017 | Unger | .................... | B60W 40/06 |

FOREIGN PATENT DOCUMENTS

| | | | | |
|---|---|---|---|---|
| JP | 2009-119947 A | 6/2009 | | |
| KR | 10-2017-0036458 A | 4/2017 | | |
| KR | 10-2017-0059052 A | 5/2017 | | |
| WO | WO-2009097947 A1 * | 8/2009 | ......... | B60G 17/0165 |

\* cited by examiner

ACTIVE VEHICLE HEIGHT CONTROL METHOD

CROSS REFERENCE TO RELATED APPLICATION

The present application claims priority to Korean Patent Application No. 10-2019-0072759 filed on Jun. 19, 2019, the entire contents of which is incorporated herein for all purposes by this reference.

BACKGROUND OF THE INVENTION

Field of the Invention

The present invention relates to a technology of actively controlling the height of a vehicle body from the ground.

Description of Related Art

An Electronic Controlled Suspension (ECS) of the related art is a semi-active damper system which is used to achieve both of riding comfort and handling for a vehicle.

Recently, an active damper system that can actively apply force between a vehicle body and wheels have been provided and this system can control the posture and height of a vehicle.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an active vehicle height control method that can improve riding comfort of a vehicle and secure a more stable vehicle posture by appropriately controlling the height of a vehicle body by driving an active actuator of the vehicle against a speed bump or an uneven road ahead.

In view of an aspect of the present invention, an active vehicle height control method includes: securing a road surface profile for unevenness of a road ahead of a vehicle; forming a target vehicle height profile by filtering the road surface profile; forming, by a controller, a disturbance profile using the road surface profile and the target vehicle height profile; estimating, by the controller, vehicle behavior for the disturbance profile; determining, by the controller, an inverse-phase control force that minimizes the estimated vehicle behavior; and driving, by the controller, an actuator using the inverse-phase control force.

In the forming of a target vehicle height profile, the target vehicle height profile may be formed by applying a forward-backward filter configured in a sequence of a primary low-pass filter and a primary delay, a flip, and a secondary delay and a second low-pass filter.

The forward-backward filter may be implemented by adjusting a cut-off frequency, a filter order, and a delay value to follow an optimization vehicle height profile determined by using a vehicle model and the road surface profile.

In the forming of a disturbance profile, the disturbance profile may be formed by subtracting the target vehicle height profile from the road surface profile.

In view of another aspect of the present invention, an active vehicle height control device includes: a vision sensor that generates a road surface profile of a road surface ahead of a vehicle; a forward-backward filter that forms a target vehicle height profile by filtering the road surface profile output from the vision sensor; an actuator that can adjust a height of the vehicle; and a controller that forms a disturbance profile using the road surface profile and the target vehicle height profile, estimates vehicle behavior for the disturbance profile, determines an inverse-phase control force that minimizes the estimated vehicle behavior, and drives the actuator by using the inverse-phase control force.

The forward-backward filter may be configured in the sequence of a primary low-pass filter and a primary delay, a flip, and a secondary delay and a second low-pass filter.

The controller may be configured to form the disturbance profile by subtracting the target vehicle height profile from the road surface profile.

According to an exemplary embodiment of the present invention, it is possible improve riding comfort of a vehicle and secure a more stable vehicle posture by appropriately controlling the height of a vehicle body by driving an active actuator of the vehicle against a speed bump or an uneven road ahead, consequently improving the commercial value of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
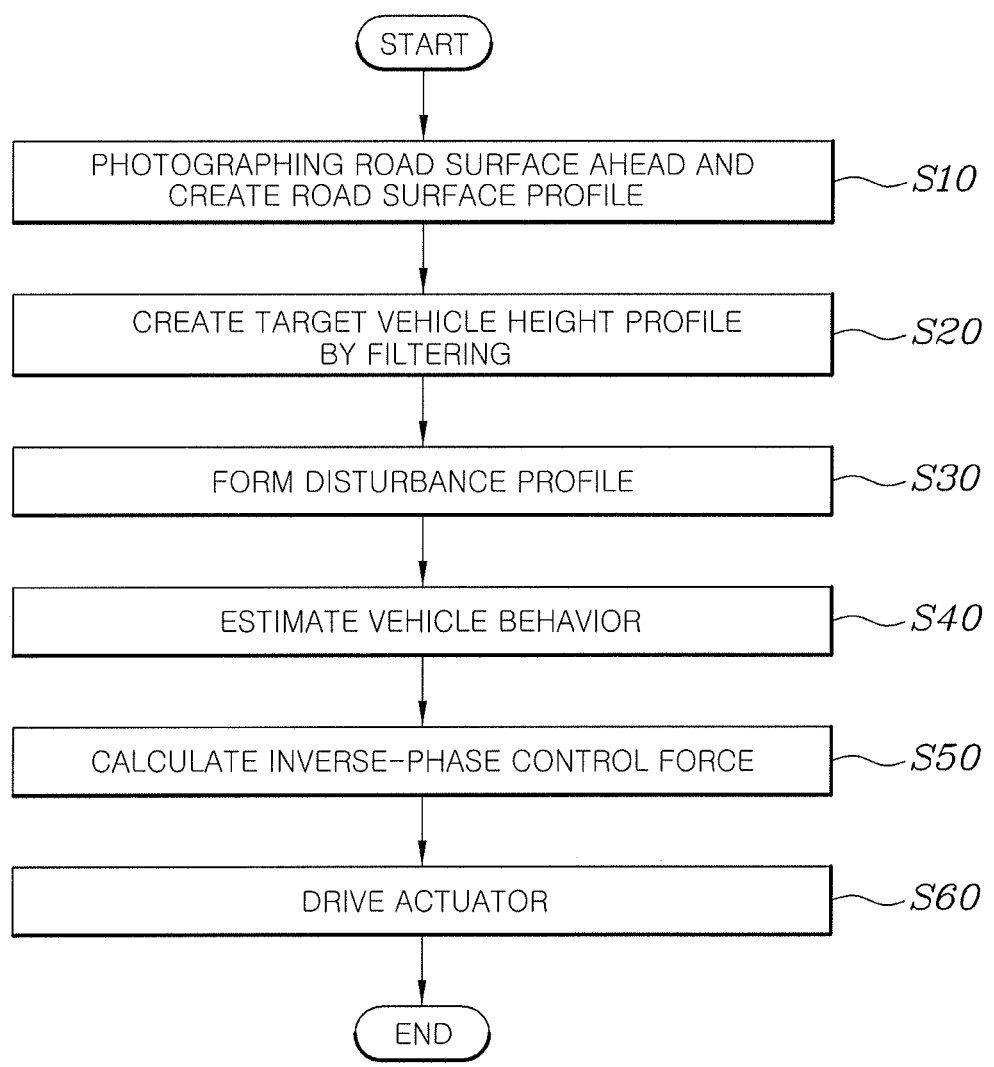
FIG. 1 is a flowchart showing an exemplary embodiment of an active vehicle height control method according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Referring to FIG. 1, an exemplary embodiment of an active vehicle height control method of the present invention includes: securing a road surface profile for unevenness of a road ahead of a vehicle (S10); forming a target vehicle height profile by filtering the road surface profile (S20); forming, by a controller, a disturbance profile using the road surface profile and the target vehicle height profile (S30); estimating, by the controller, vehicle behavior for the disturbance profile (S40); determining, by the controller, an inverse-phase control force that minimizes the estimated vehicle behavior (S50); and driving, by the controller, an actuator using the inverse-phase control force (S60).

That is, the present invention has been designed to be configured to improve riding comfort and secure a more stable vehicle posture by minimizing vehicle behavior by photographing unevenness of a road surface ahead of a vehicle in advance using a vision sensor etc., generating a road surface profile of the unevenness, rapidly converting the road surface profile into a target vehicle height profile through filter, and controlling the vehicle using the road surface profile and the target vehicle height profile.

Figure 2:
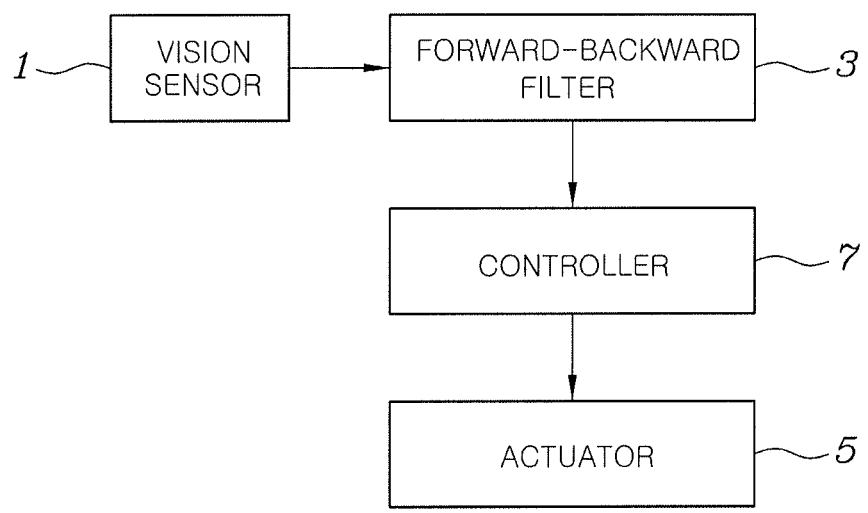
FIG. 2 is a diagram showing the configuration of an active vehicle height control method according to an exemplary embodiment of the present invention.

FIG. 2 is a diagram showing the configuration of an active vehicle height control device that implements the active vehicle height control method described above. The active vehicle height control device may include: a vision sensor 1 that generates a road surface profile of a road surface ahead of a vehicle; a forward-backward filter 3 that forms a target vehicle height profile by filtering the road surface profile output from the vision sensor 1; an actuator 5 that can adjust the height of the vehicle; and a controller 7 that forms a disturbance profile using the road surface profile and the target vehicle height profile, estimates vehicle behavior for the disturbance profile, determines an inverse-phase control force that minimizes the estimated vehicle behavior, and drives the actuator by using the inverse-phase control force.

The vision sensor 1 includes a camera, a preview sensor, etc., and conventional device that have a function of photographing a road surface ahead and generating a profile of unevenness of the road surface on the basis of the taken images.

The actuator 5, for example, may include four actuators that can actively control vertical force between a vehicle body and four wheels of a vehicle, or may be the active actuator of an ECS system having an active actuator.

Figure 3:
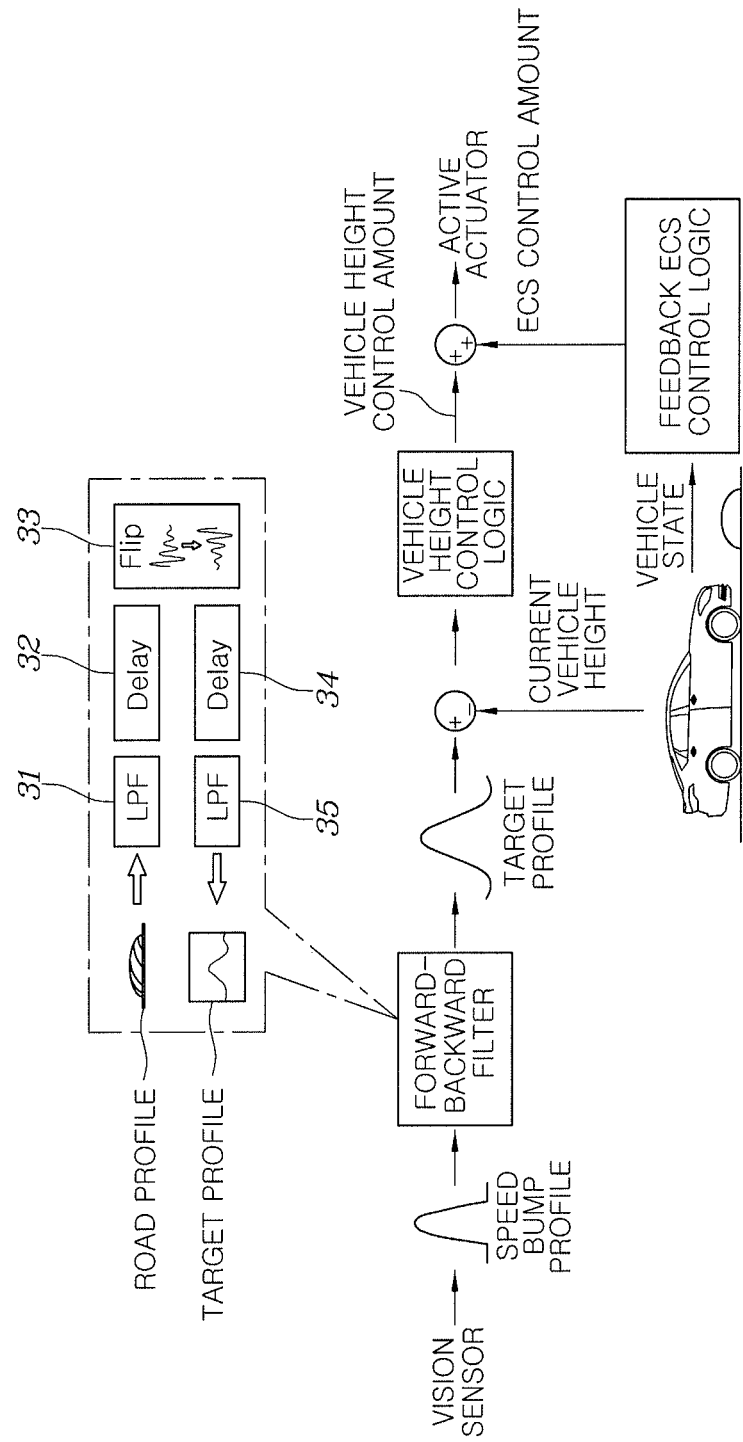
FIG. 3 is a diagram showing an example of applying the present invention to an ECS system.

FIG. 3 is a diagram conceptually illustrating an example of controlling an active actuator by summing upwards a vehicle height control amount as an exemplary embodiment of the present invention and a control amount generated by an ECS logic by applying the present invention to an ECS system having an active actuator.

The target vehicle height profile, which is a profile in which a vehicle height changes with as time passes, is rapidly obtained through filtering, as described above, to be configured to improve riding comfort and secure a more stable vehicle posture by minimizing vehicle behavior when the vehicle is driven over an uneven surface.

The forward-backward filter that generates the target vehicle height profile by filtering the road surface profile, as shown in FIG. 3, is configured in the sequence of a primary low-pass filter 31 and a primary delay 32, a flip 33, and a secondary delay 34 and a second low-pass filter 35.

The forward-backward filter is implemented by adjusting a cut-off frequency, a filter order, and a delay value to follow an optimization vehicle height profile determined by using a vehicle model and the road surface profile.

The optimal vehicle height profile, which is a profile obtained through an optimization process by inputting a vehicle model, an optimal vehicle height profile, and a cost are configured together to a computer, is an ideal file in which a vehicle height may be changed as time passes to be configured to improve riding comfort and secure a more stable vehicle posture by minimizing vehicle behavior when the vehicle is driven over a corresponding uneven surface.

Although it may be ideal control to control a vehicle using the optimal vehicle height profile rather than the target vehicle height profile, the work that generates the optimal vehicle height profile is achieved by performing optimization work for several hours through a computer, so it is actually impossible to apply the optimal vehicle height profile to a vehicle.

Accordingly, the present invention controls a vehicle using the target vehicle height profile which may be instantaneously obtained through filtering, although it is insufficient in comparison to the optimal vehicle height profile.

Figure 4:
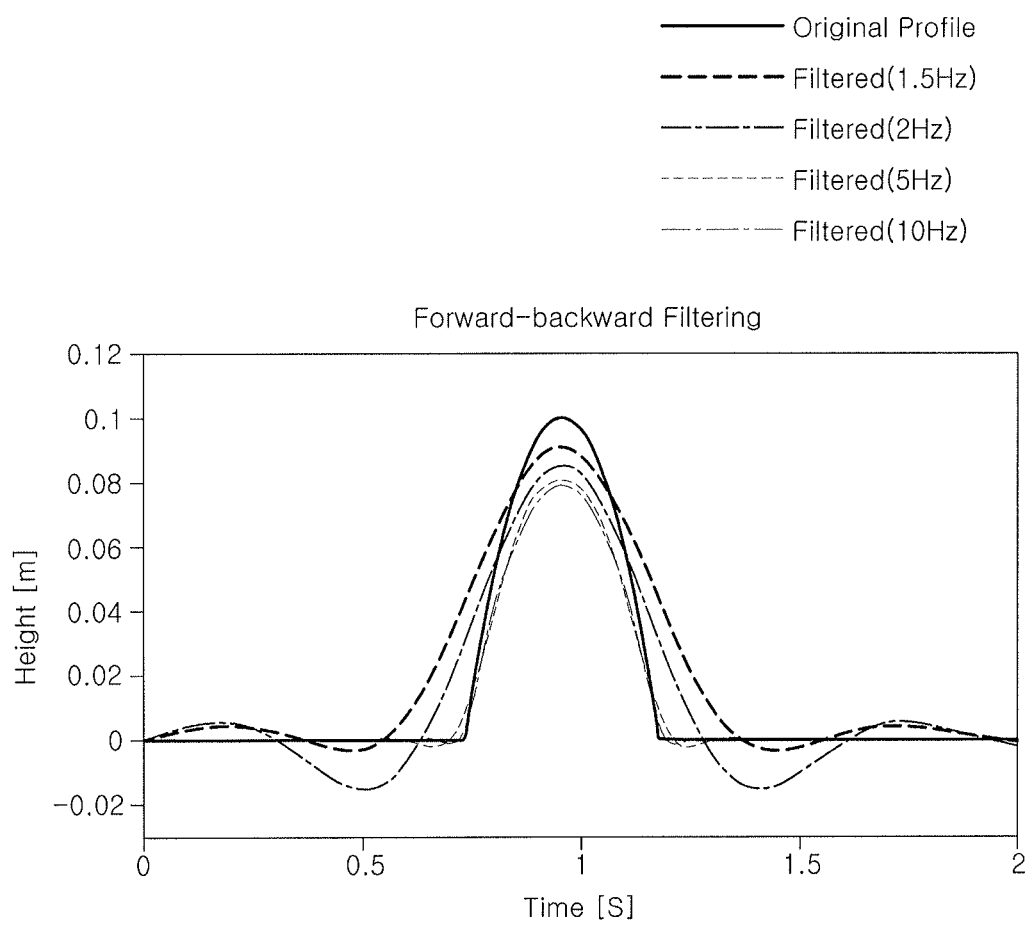
FIG. 4 is a graph comparing filtering results while changing a cut-off frequency of a forward-backward filter of the present invention to a road surface profile.
Figure 5:
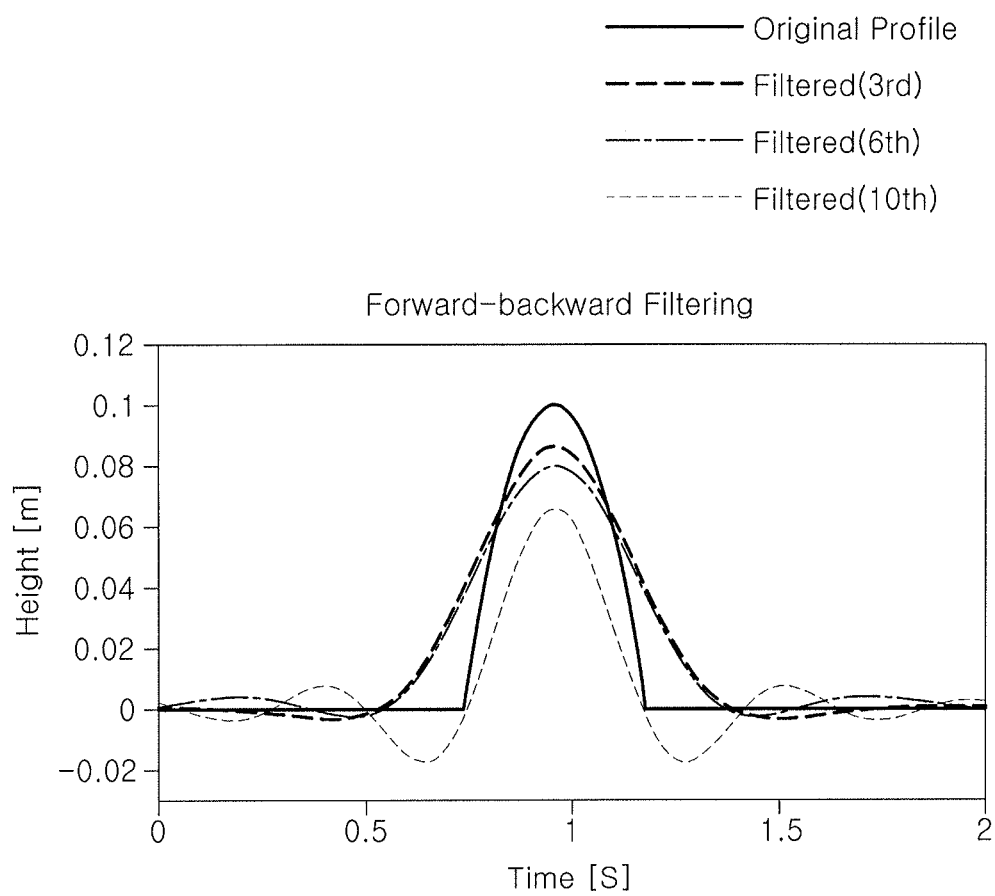
FIG. 5 is a graph comparing filtering results while changing a filter order of the forward-backward filter of the present invention to a road surface profile.

Accordingly, designing a forward-backward filter that performs filtering is important and the present filter is designed through several trial and error, as exemplified in FIG. 4 and FIG. 5, using the principle that the shape of a filtering result profile is changed by changing the cut-off frequency and the filter order of a filter.

For reference, Original Profile means a road surface profile and it is possible to adjust a maximum value of a profile by adjusting a delay value in the forward-backward filter.

For reference, the following is an example of a forward-backward filter designed by the method described above.

$$H(z) = K \frac{3.6797e^{-10}(z^4 + 4z^3 + 6z^2 + 4z + 1)}{z^4 - 3.967z^3 + 5.902z^2 - 3.902z + 0.0676} \times \frac{0.004988}{z - 0.995}$$

where,
H: filter function name
z: z-operator
K: tuning proportional constant
In the present equation, the term $$K \frac{3.6797e^{-10}(z^4 + 4z^3 + 6z^2 + 4z + 1)}{z^4 - 3.967z^3 + 5.902z^2 - 3.902z + 0.0676}$$

is a low-pass filter term of which the order is 4 and the cut-off frequency is 2 Hz, and the term $$\frac{0.004988}{z - 0.995}$$

shows implementing a delay of 200 ms.

Substantially, the filter of the equation corresponds to the primary low-pass filter 31 and primary delay 32, and the secondary delay 34 and secondary low-pass filter 35 may be configured in the same way.

That is, a road surface profile is processed through the filter of the equation, the phase is inversed for flipping, and then the road surface profile is processed again through the filter of the equation, generating the target vehicle height profile.

Figure 6:
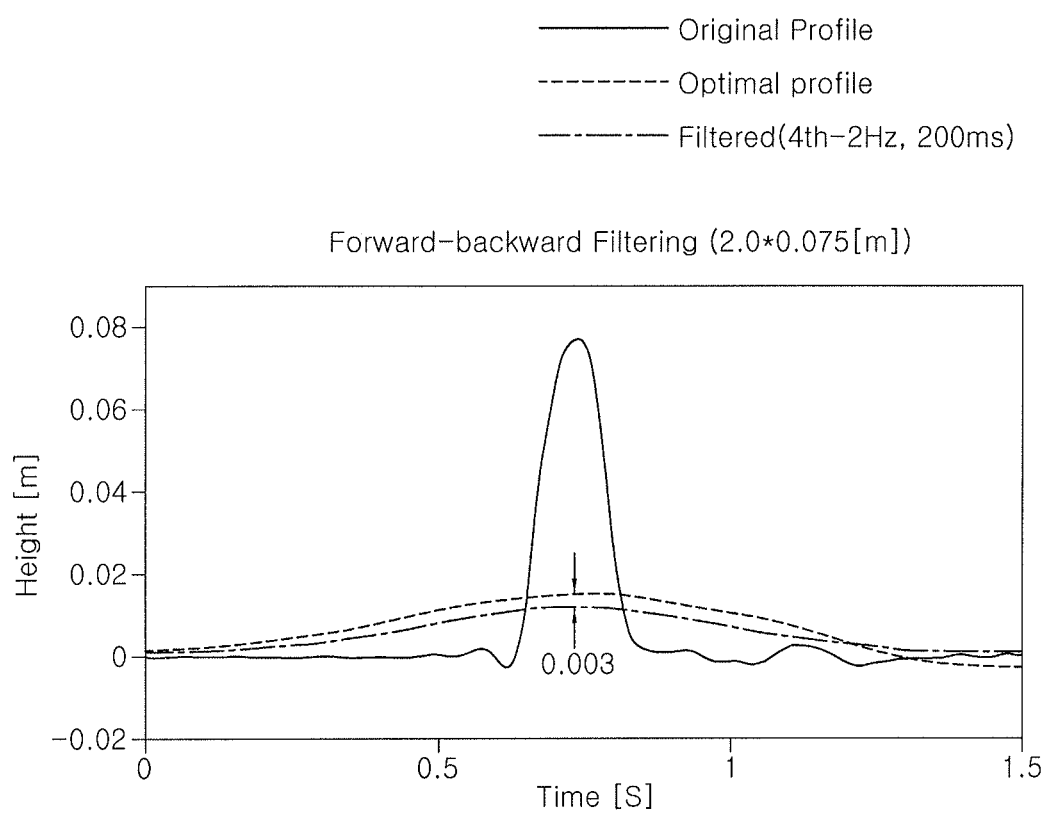
FIG. 6 is a graph comparing an optimal vehicle height profile determined by an optimization technique for the road surface profile of a first-class unevenness and a target vehicle height profile filtered by the forward-backward filter.

FIG. 6 is a graph comparing an optimal vehicle height profile determined by an optimization technique for the road surface profile of a first-class unevenness and a target vehicle height profile filtered by the forward-backward filter, in which it may be seen that a target vehicle height profile is formed very similarly to an optimal vehicle height profile.

The first-class unevenness means a speed bump with a width of 2.0 m and a maximum height of 0.075 m, a second-class unevenness means a speed bump with a width 3.6 m and a maximum height of 0.1 m, and a third-class unevenness means a speed bump with a width of 6.1 m and a maximum height of 0.125 m.

Figure 7:
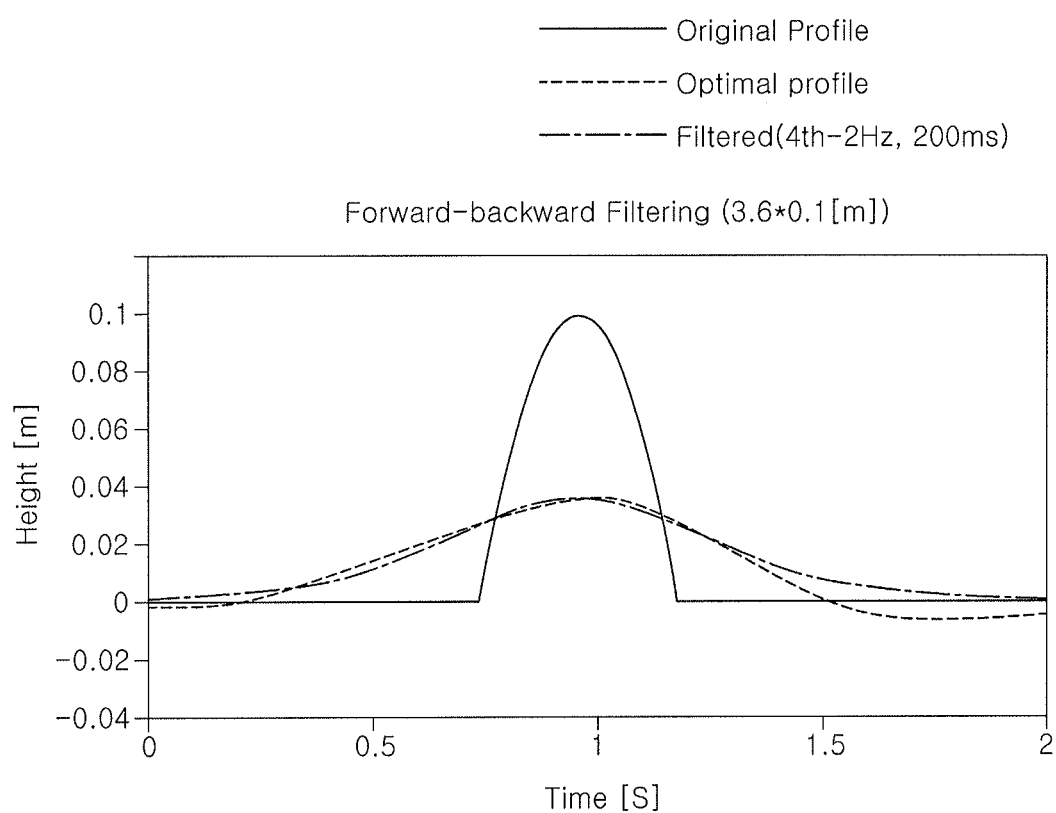
FIG. 7 is a graph comparing an optimal vehicle height profile determined by an optimization technique for the road surface profile of a second-class unevenness and a target vehicle height profile filtered by the forward-backward filter.
Figure 8:
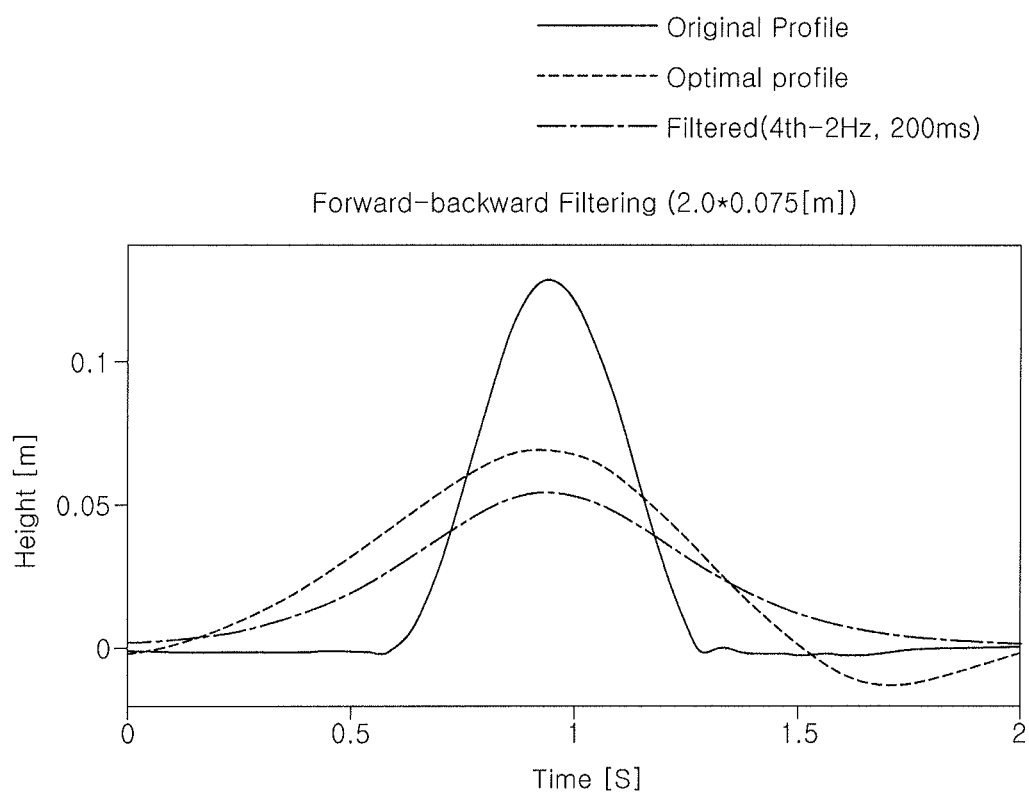
FIG. 8 is a graph comparing an optimal vehicle height profile determined by an optimization technique for the road surface profile of a third-class unevenness and a target vehicle height profile filtered by the forward-backward filter.

FIG. 7 and FIG. 8 are graphs respectively comparing second-class unevenness and third-class unevenness, as in FIG. 6, in which it may be seen that target vehicle height profiles are formed similarly to optimal vehicle height profiles.

For reference, Original Profile means a road surface profile, Optimal Profile means an optimal vehicle height profile, and Filtered means a target vehicle height profile.

In the forming of a disturbance profile, the disturbance profile is formed by subtracting the target vehicle height profile from the road surface profile.

Figure 9:
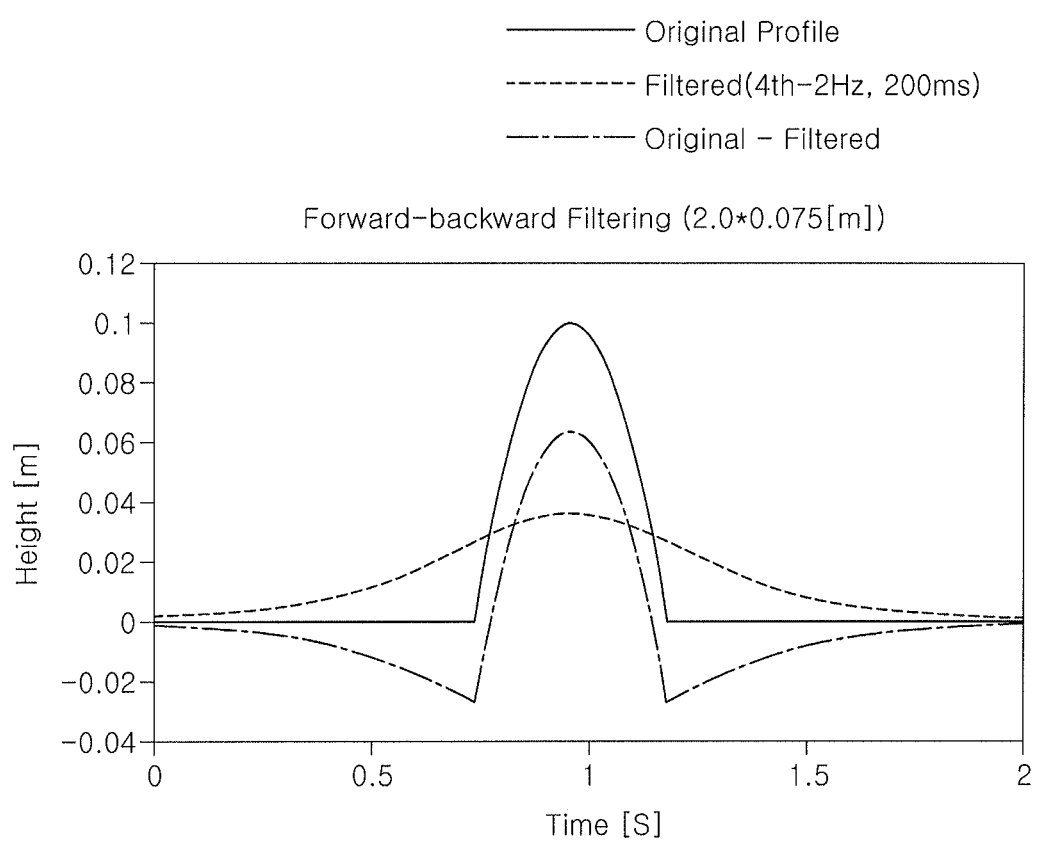
FIG. 9 is a graph showing a road surface profile, and a target vehicle height profile and a disturbance profile for the road surface profile.
Figure 10:
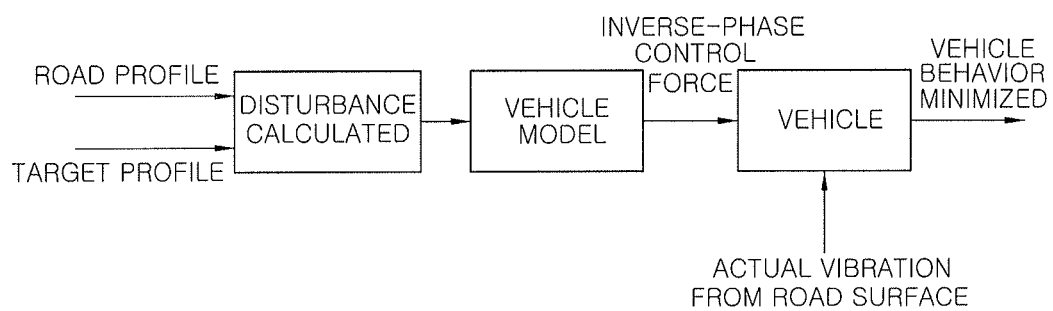
FIG. 10 is a block diagram showing a process of minimizing vehicle behavior by controlling the vehicle using a road surface profile and a target vehicle height profile when the vehicle is driven over an uneven surface.

FIG. 9 is a graph that shows forming the disturbance profile, in which Original Profile means a road surface profile, Filtered means a target vehicle height profile, and Original-Filtered means a disturbance profile.

The vehicle height of a vehicle body may move in accordance with the target vehicle height profile, so when the vehicle is driven over a corresponding uneven surface, behavior of the vehicle is minimized, whereby riding comfort may be improved and a more stable vehicle posture may be secured.

However, in an exemplary embodiment of the present invention, rather than target vehicle height profile, the target vehicle height profile using an actuator, as described above, vehicle behavior according to the disturbance profile is estimated, an inverse-phase control force that minimizes the estimated vehicle behavior is determined, and an actuator is driven by the inverse-phase control force.

Considering the disturbance profile, it is possible to assume that a vehicle is not moved and a road surface moves in the shape of unevenness according to the disturbance profile under the vehicle on the basis of relative conception. Accordingly, the above-mentioned configuration is based on concept that a vehicle would be able to be driven over a corresponding uneven surface in the most stable posture by considering the disturbance profile as a disturbance which is input to the vehicle and performing control such that vehicle behavior may be minimized.

When estimating vehicle behavior according to the disturbance profile, the controller is made control behavior of the vehicle using a simplified vehicle model having a total of seven degrees of freedom including roll, pitch, bounce, and four wheels.

Technologies well known in the art are used for the technology of estimating vehicle behavior when a disturbance acts in the vehicle model and a technology of determining an inverse-phase control force for minimizing the behavior are used.

The controller drives the actuator using the inverse-phase control force consequently determined as described above, so that the vehicle is driven over a corresponding uneven surface, and accordingly, an effect of great improvement of riding comfort of the vehicle may be achieved.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle height control method comprising:
   securing, by a sensor, a road surface profile for unevenness of a road ahead of a vehicle;
   forming a target vehicle height profile by filtering the road surface profile;
   forming, by a controller, a disturbance profile using the road surface profile and the target vehicle height profile;
   estimating, by the controller, vehicle behavior for the disturbance profile;
   determining, by the controller, an inverse-phase control force that minimizes the estimated vehicle behavior; and
   driving, by the controller, an actuator using the inverse-phase control force to adjust a height of the vehicle.

2. The vehicle height control method of claim 1,
   wherein, in the forming of the target vehicle height profile, the target vehicle height profile is formed by applying a forward-backward filter configured in a sequence of a primary low-pass filter and a primary delay, a flip, and a secondary delay and a second low-pass filter.

3. The vehicle height control method of claim 2, wherein the forward-backward filter is implemented by adjusting a cut-off frequency, a filter order, and a delay value to follow an optimization vehicle height profile determined by using a vehicle model and the road surface profile.

4. The vehicle height control method of claim 1, wherein, in the forming of the disturbance profile, the disturbance profile is formed by subtracting the target vehicle height profile from the road surface profile.

5. A vehicle height control device, comprising:
a vision sensor that generates a road surface profile of a road surface ahead of a vehicle;
a forward-backward filter that forms a target vehicle height profile by filtering the road surface profile output from the vision sensor;
an actuator that is mounted in the vehicle and configured to adjust a height of the vehicle; and
a controller that forms a disturbance profile using the road surface profile and the target vehicle height profile, estimates vehicle behavior for the disturbance profile, determines an inverse-phase control force that minimizes the estimated vehicle behavior, and drives the actuator by using the inverse-phase control force.

6. The vehicle height control device of claim 5, wherein the forward-backward filter is configured in a sequence of a primary low-pass filter and a primary delay, a flip, and a secondary delay and a second low-pass filter.

7. The vehicle height control device of claim 6, wherein the controller is configured to form the disturbance profile by subtracting the target vehicle height profile from the road surface profile.

* * * * *